Patented Jan. 1, 1935

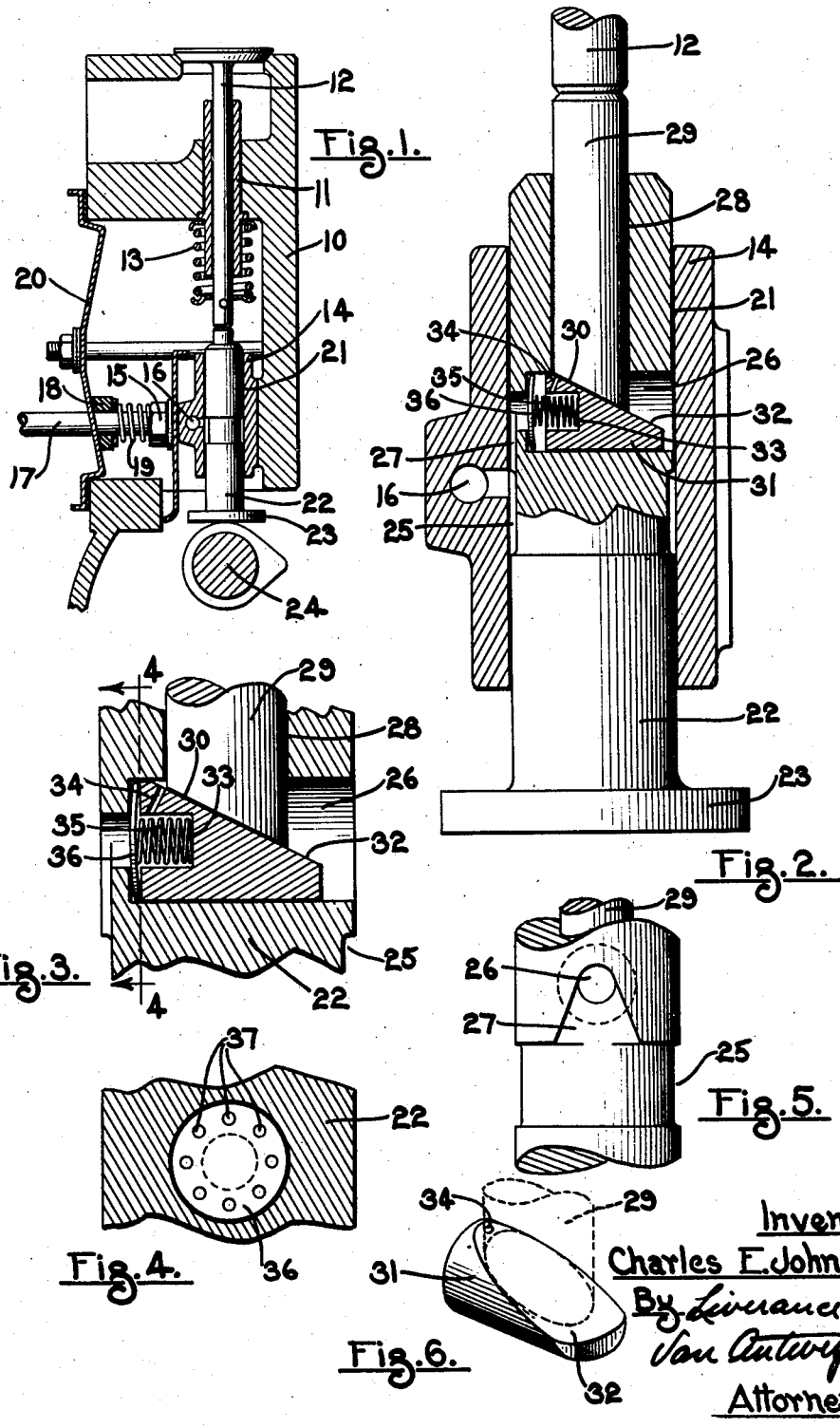

1,986,579

UNITED STATES PATENT OFFICE 1,986,579

SELF-ADJUSTING MECHANICAL VALVE-TAPPET

Charles E. Johnson, North Muskegon, Mich.

Application November 13, 1933, Serial No. 697,786

8 Claims. (Cl. 123—90)

This invention relates to tappet construction generally and more particularly is directed to a self-adjusting mechanical valve tappet.

Tappet constructions of somewhat similar character are set forth in my several applications filed on January 11, July 29, and September 26, 1932, these applications bearing the respective Serial Numbers 585,859; 625,622 and 634,857.

As described in these specifications, the pressure of the oil acts directly upon the parts which are to be expanded or separated and thus any loss of oil from the system causes corresponding decrease in the length of the tappet construction. That is, the construction involved in this invention consists generally of a tappet member, riding against a cam shaft and a plunger member slidably mounted in the tappet, abutting against the lower end of the valve to operate the same. The plunger and the tappet are separated by the automatic take up means.

In my improved construction, I provide a wedge member between the plunger and the tappet member, this wedge member being slid at right angles to the plunger and having an angled or beveled surface camming thereagainst, the angle or contact being predetermined as desired and normally being in the ratio of one to two or one to three, this construction causing a displacement of either twice or three times as much oil as would be displaced in the constructions as set forth in my copending applications. Thus, the effect of leakage of the oil is minimized.

Another advantage attained by my novel construction is the fact that the oil pressure, this being furnished by the oil pump of the internal combustion engine or as otherwise desired, increases its effect due to the use of the wedge construction as will be readily understood. The pressure of the oil acts against the end of the wedge and movement of the wedge moves the plunger upwardly but at a slower speed due to the angular contacting surfaces.

Yet another advantage resides in my means for permitting the escape of air from the system. As shown, I provide a small duct through which the air may escape to seep upwardly about the plunger, this duct being open when the plunger is separated from the valve and being closed whenever the several parts are in operative position. It will also be appreciated that the increased ratio of movement of the wedge member is desirable in the operation of this manner of opening and closing the duct.

Other advantages will become apparent as the invention is unfolded.

Referring to the drawing:—

Fig. 1 is a sectional view through an engine having my valve tappet construction applied thereto.

Fig. 2 is an enlarged view, partly in section, of the tappet guide and the tappet construction therein.

Fig. 3 is a fragmentary view of Fig. 2 illustrating the wedge member in its inoperative position.

Fig. 4 is a sectional view taken along the line 4—4 of Fig. 3.

Fig. 5 is a side view of the upper end of the valve tappet.

Fig. 6 is a perspective view showing the wedge member, a portion of the plunger being shown in dotted lines.

Like numerals refer to like parts throughout the several views.

In the drawing, numeral 10, see Fig. 1, represents the wall of the cylinder of an engine, 11 a valve guide mounted therein and 12 the valve itself. A spring construction 13 maintains the valve in its closed position.

A tappet guide or bushing 14 extends adjacent to the wall 10 and bolts 15 extend therethrough to maintain the same in place. This member 14 may receive one or more of the self-adjusting tappet constructions and is provided with a longitudinal passageway 16. An oil pipe 17, from any suitable source, leads to the passageway 16, a rubber washer member 18 and spring 19 providing a tight connection for this oil pipe at the point where it passes through the closure member 20.

The member 14 has one or more cylindrical openings 21 extending therethrough, see Figs. 1 and 2, and the passage 16 leads through the wall of each of these openings for a purpose to be later described. A tappet member 22 has a head 23 at its lower end, this head riding against and being operated by the cam shaft construction 24. The tappet member 22, see Fig. 5, is grooved entirely therearound as indicated at 25 and a lateral bore 26 is formed a short distance above this groove 25 and is connected thereto by means of the passageway 27. An axial opening 28 leads from the bore 26 upwardly to the upper end of the tappet member, this recess 28 receiving the plunger or plug member 29 slidably therein. This member 29 is formed with a loose fit whereby air may escape upwardly therearound. The upper end of the plunger member 29 contacts against the lower end of the valve member and causes operation of the same.

The lower end of the plunger member 29 is cut away at an angle as indicated at 30 and a wedge member 31 having an angled surface 32, see Fig. 6, engages with the lower end of the plunger or plug member and corresponding movement is had between these two members. The wedge member 31 is recessed as at 33 and a small outlet opening, this permitting the passage of air therethrough, is indicated at 34. A spring 35 is seated in the recess 33 and bears against a disc valve member 36. The disc member 36, see Figs. 3 and 4, is of curved construction to prevent its sticking to its seat and is provided with a series of small openings 37 through which the oil passes. If desired, the recess 33 in the wedge member may be enlarged at its outer end so as to permit a somewhat freer passage of the oil through the disc valve but the curvature of the disc, see Fig. 3, is sufficient to permit the passage of oil thereby only when the disc is moved away from the smaller portion of the bore 26.

The operation

The several parts are positioned as shown in Fig. 3 prior to the starting of the internal combustion engine. In this position, the wedge members are free from any hydraulic pressure and thus the engagement of the lower end of the plunger member 29 forces them against the restricted end of the bore or cylindrical recess 26. Upon starting of the engine, the oil pressure immediately builds up and is transmitted through the pipe 17, passageway 16, groove 25 and into the small end of the bore 26 whereupon it pushes against the valve disc 36 and causes both the valve disc and the wedge member to move to the right as shown in Figs. 2 and 3. During this movement any air which is in the system will be forced upwardly through the small opening 34, this being uncovered at its upper end, and thus air will be eliminated. Air, as is well known, is compressible and consequently is highly objectionable in a system of this character.

Next, the cam shaft 24 rotating, causes upward movement of the tappet member 22 and its associated parts whereupon the tendency is for the wedge member 31 to move to the left against the hydraulic pressure. This action is not permitted however, due to the seating of the disc 36 as shown in Fig. 2, this seating being by the spring means 35.

The cam shaft continues its rotation and operates the several valves through the several improved mechanisms as described, the wedge members sliding to the left, or tending to slide to the left whenever a bubble of air may seep upwardly with the oil, but quickly eliminating this bubble of air through the duct 34 and then again sliding so as to take up all play and looseness between the tappet 22 and the plunger 29. Thus a quiet, smooth running engine is attained.

The invention is defined in the appended claims and is to be considered comprehensive of all forms of structure coming within their scope.

I claim:

1. In a push rod, the combination with a guide member, of a valve tappet slidably confined within said guide member, said valve tappet provided with a longitudinal bore, a plunger confined within the bore and leaving an unfilled space below said plunger, wedge means acting against the lower end of the plunger and means for admitting liquid adjacent to the wedge means for the purpose described.

2. A combination of elements as set forth in claim 1 but also having means for maintaining the liquid under constant pressure.

3. In combination, a tappet member adapted to engage against a cam, said tappet member having a recess therein, a plunger or plug loosely mounted in said recess, said plunger or plug being slidable with respect to the tappet, means for providing hydraulic fluid under pressure and mechanical means acted on by said pressure fluid whereby entry of the pressure fluid causes a different degree of movement of the plunger or plug from that of the said means for the purpose described.

4. A valve tappet comprising, a tappet body having an interior opening, a plunger slidably mounted in said tappet body and extending to said interior opening, a wedge member engaging the lower end of the plunger and adapted to cause upward movement of the same, means for introducing oil into the said interior opening to move the wedge member and valve means to prevent return movement of the oil.

5. In a device of the character described, a tappet guide, a tappet slidably mounted therein, one end of said tappet being adapted for engagement with a cam shaft, the other end of said tappet having a recess therein, a plunger slidably mounted in said recess, a wedge member located in said recess and contacting with the plunger whereby movement of the wedge member causes a different degree of movement of the plunger and means for moving the wedge member, said means including a pressure fluid supplied thereto and check valve means to prevent return movement of the pressure fluid.

6. In combination, a guide, a tappet slidably mounted in said guide, a plunger slidably mounted in said tappet, said plunger having a beveled surface therein, a member having a beveled surface contacting against the first mentioned beveled surface and means for exerting pressure against the said second member, said means preventing movement of the plunger when the plunger is under heavy strain.

7. A combination of elements as in claim 6 in which pressure fluid is utilized as the operating means for the wedge member, said wedge member having a small opening leading from its side which is engaged by the pressure fluid upwardly to its beveled surface.

8. A self adjusting mechanic valve tappet comprising a guide, a tappet member slidable therein, said tappet member having a longitudinal opening and a laterally extending opening connected therewith, the plunger mounted in said longitudinal opening, the lower end of said plunger being formed at an angle, a wedge member having an inclined portion complementary to the lower surface of the plunger member, said wedge member being slidably received in the lateral opening, hydraulic means for exerting pressure against the larger end of the wedge member and check valve means to prevent return of said pressure fluid.

CHARLES E. JOHNSON.